Nov. 2, 1965    K. P. MARTIN ETAL    3,215,474
PRELOADED GIB

Filed Sept. 6, 1962    2 Sheets-Sheet 1

INVENTORS
KENNETH P. MARTIN
BY ROBERT F. DARLING

Hugh N Roelso
ATTORNEY

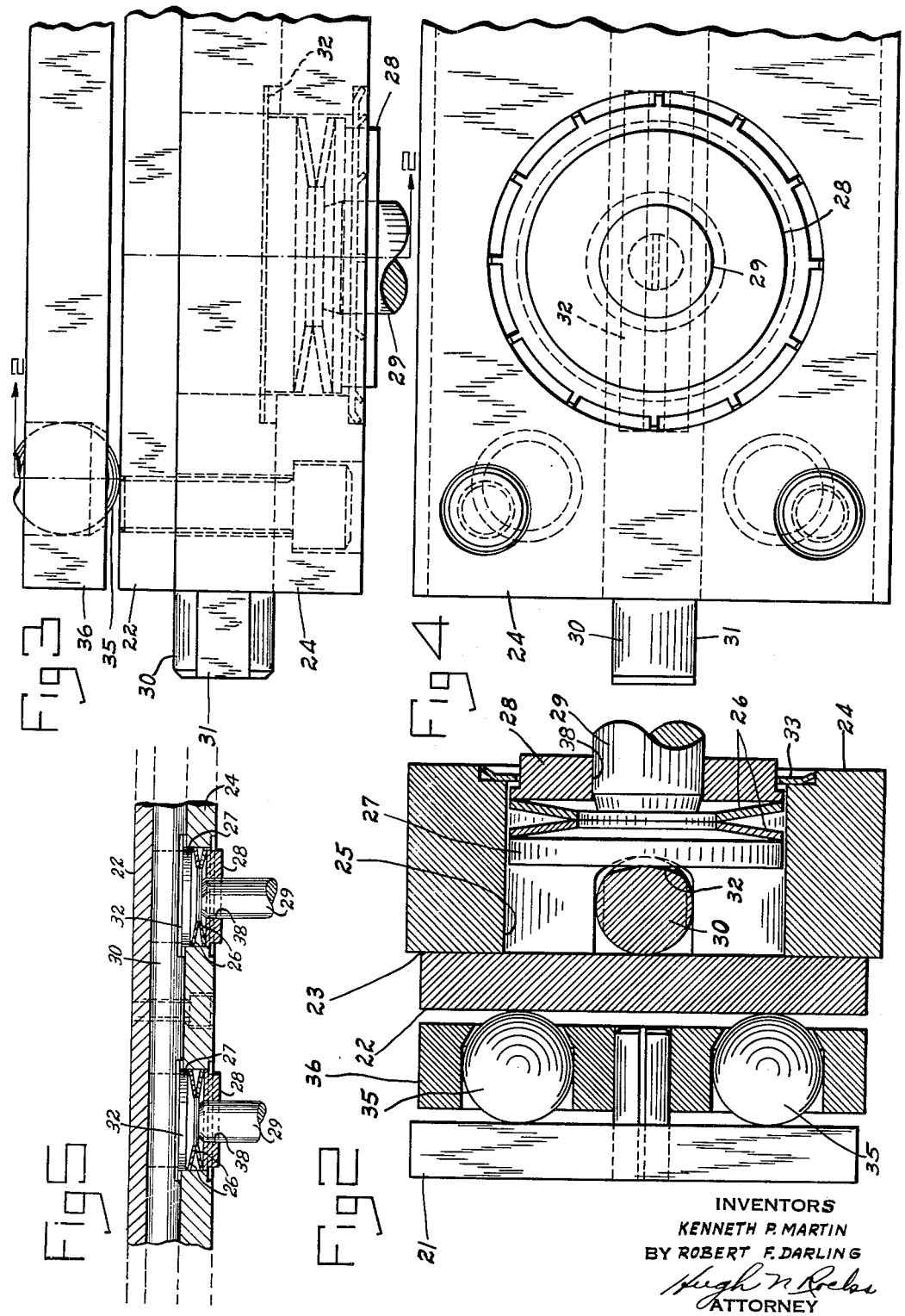

3,215,474
PRELOADED GIB
Kenneth P. Martin and Robert F. Darling, Beloit, Wis., assignors, by mesne assignments, to Landis Tool Company, Waynesboro, Pa., a corporation of Pennsylvania
Filed Sept. 6, 1962, Ser. No. 221,819
2 Claims. (Cl. 308—3)

This invention relates to a machine tool, particularly to a gib for a guide surface of said machine tool.

A gib is usually a device in the form of a strip of steel or other material held in engagement with a guide surface by means of a wedge. The wedge is usually adjustable to take up wear between the gib and the guide surface, or to serve as means to clamp a slidable member against movement. It is extremely difficult to provide uniform pressure on such a gib over its entire length.

It is, therefore, an object of the present invention to provide a gib assembly which includes means for automatically adjusting the gib for wear.

Another object is to provide a gib in the form of a cartridge which consists of a gib member, resilient means for applying a load to said gib member, and a cam rod for applying or removing said load on said gib member.

Another object is to provide a plurality of resilient members longitudinally spaced in said gib cartridge for applying a uniform pressure from end to end of the gib.

Another object is to provide a machine tool slide with a ball guide member and means for applying a preload to said ball guide member.

FIG. 2 is an enlarged sectional end elevation of the cartridge gib and ball guide.

FIG. 3 is a plan view showing the means for applying and removing the load on the ball guide.

FIG. 4 is a partial rear elevation of one of the longitudinally spaced resilient members of the cartridge gib.

FIG. 5 is a partial, sectional plan view of the structure shown in FIG. 3.

Figure 1:
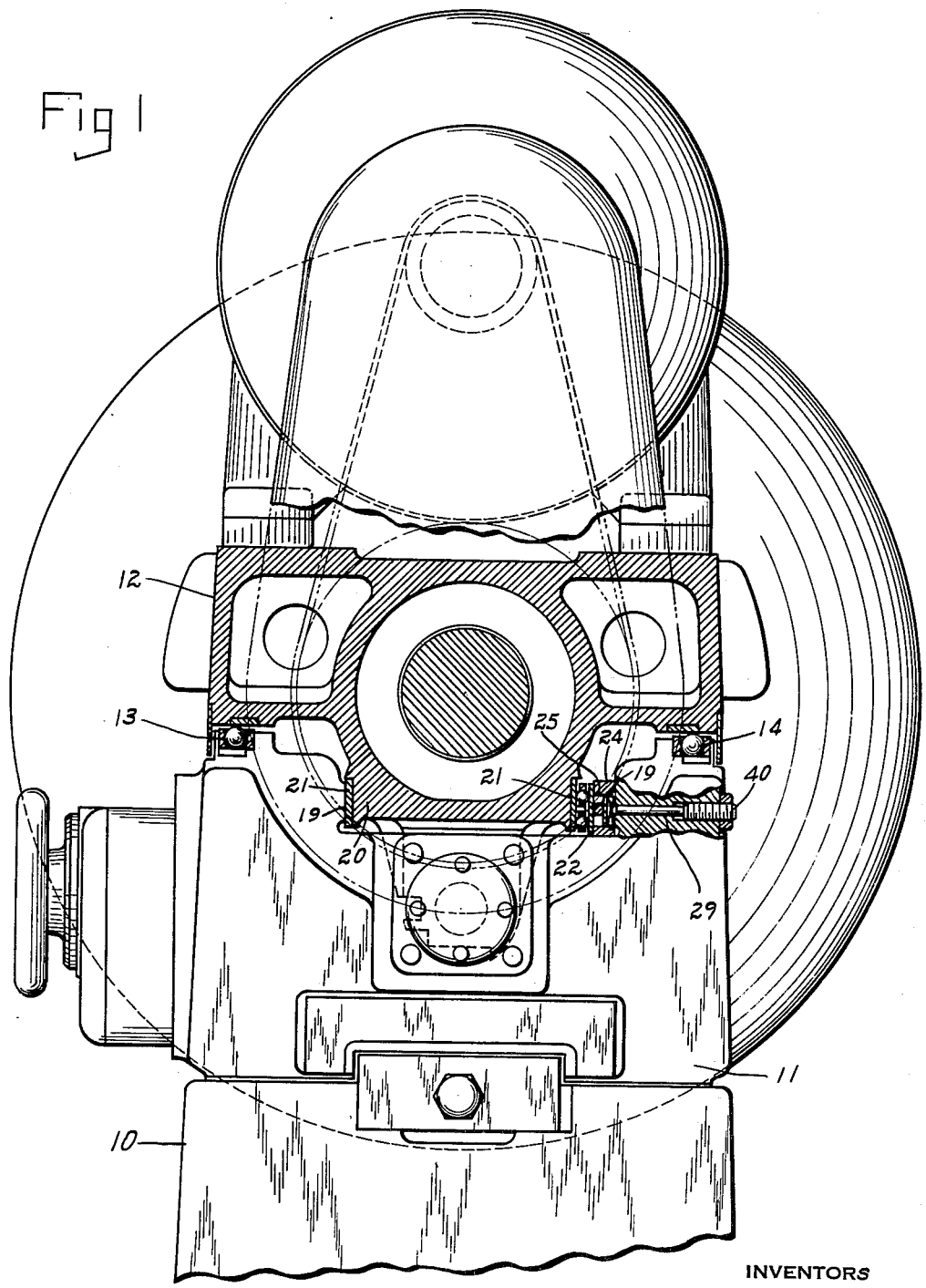
FIG. 1 is an end elevation of the upper portion of a disc grinder showing a cartridge gib and an adjusting screw in combination with a ball guide.

Numeral 10 indicates the base of a disc grinder. Spindle housing 12 is supported on slide 11 by ball guides 13 and 14.

A downwardly extending guide portion or member 20 of spindle housing 12 has hardened guide tracks 21, one of which engages a co-acting surface on slide 11, the other of which engages ball track 22 on cartridge gib 23.

Gib 23 consists of a body member 24, the same length as slide 11, having ball track 22 attached thereto, and having a plurality of longitudinally spaced openings 25, each of which contains a Belleville spring 26 and a load applying disc 27. Discs 28 are inserted in openings 25 on the opposite side of springs 26 from discs 27. Each disc 28 is held in body member 24 by a retaining ring 33. When gib 23 is in operative position, discs 28 engage surface 19 on the right hand side of slide 11. Cam rod 30 extends through body member 24 and has a plurality of spaced cam portions 32 engaging discs 27. The end of cam rod 30 has opposed flat surfaces 31 to which a wrench may be applied. Pin 29 fits into the openings 38 in discs 28 to locate gib 23 endwise and thereafter to prevent endwise movement of gib 23. Pin 29 is held in position by adjusting screw 40.

The above elements are assembled as a unit which is inserted between the ball guide 35, 36 and the right hand surface 19 on slide 11. So long as cam rod 30 is in the position shown, there is no load on springs 26. Cam rod 30 must be in this position for inserting gib 23 in the machine.

Cam rod 30 is used so that springs 26 may be free of load during insertion of gib 23. After gib 23 is inserted, cam rod 30 is turned 90° to load springs 26 and expand gib 23 between the right hand guide surface 19 on slide 11 and ball guide 35, 36. Cam rod 30 applies the same load to all springs 26 so that there is no variation in load from one end of gib 23 to the other.

We claim:

1. In a machine tool, a base, a member slidably mounted on said base, a guide member for determining the path of movement of said slidable member, said guide member having parallel guide surfaces, said base having a surface co-acting with one of said guide surfaces, a gib cartridge co-acting with said other guide surface for holding said first mentioned coacting surfaces in operative relation under a predetermined load, said gib cartridge consisting of a gib member having longitudinally spaced resilient loading means, and means for rendering said loading means operative or inoperative comprising an elongated rod rotatably mounted in said gib cartridge and having a non-circular cross-section.

2. In a machine tool, a base, a member slidably mounted on said base, a guide member for determining the path of movement of said slidable member, said guide member having parallel guide surfaces, said base having a surface co-acting with one of said guide surfaces, means for taking up wear between said base surface and said guide surface comprising a gib cartridge unit having a plurality of longitudinally spaced resilient members for expanding said gib between said guide surface and said base surface, and means for loading each of said resilient members equally and simultaneously in the direction of said guide surfaces to effect said gib expansion comprising an elongated cam member movable in said gib cartridge unit and having a cam portion for each of said resilient members.

References Cited by the Examiner
UNITED STATES PATENTS

| | | |
|---|---|---|
| 2,009,421 | 7/35 | Walz. |
| 2,340,450 | 2/44 | Bouschor. |
| 2,672,379 | 3/54 | McVey. |
| 2,832,651 | 4/58 | Berthiez _____ 308—6 |
| 3,030,155 | 4/62 | Bullard. |

ROBERT C. RIORDON, *Primary Examiner.*
FRANK SUSKO, *Examiner.*